| United States Patent | [15] | 3,705,926 |
|---|---|---|
| Rumpf et al. | [45] | Dec. 12, 1972 |

[54] MANUFACTURE OF LONG CHAIN ALPHA-OLEFINES FROM MIXTURES OF HEAVY PARAFFINS

[72] Inventors: Paul Rumpf, 23 rue Gazan, Paris; Byouk Blouri, 70 Avenue des Vergers, Bourg la Reine, both of France

[22] Filed: Feb. 20, 1970

[21] Appl. No.: 13,049

[52] U.S. Cl. ..........................260/683 R, 260/677 R
[51] Int. Cl. ...............................................C07c 11/12
[58] Field of Search..............................260/683, 677

[56] References Cited

UNITED STATES PATENTS

| 2,736,685 | 1/1953 | Wilson et al. | 196/50 |
| 2,642,466 | 6/1953 | Garner et al. | 260/683 |
| 3,103,485 | 9/1963 | Cahn | 260/683 |

FOREIGN PATENTS OR APPLICATIONS

| 1,457,683 | 9/1966 | France | 260/683 |
| 426,843 | 4/1935 | Netherlands | 260/683 |
| 812,748 | 10/1936 | France | 260/683 |

*Primary Examiner*—Delbert E. Gantz
*Assistant Examiner*—J. Nelson
*Attorney*—Hammond & Littell

[57] ABSTRACT

The invention relates to a process for preparing long-chain α-olefins from mixtures of heavy paraffins.

The starting mixture is liquified, it is preheated with an inert carrier gas such as nitrogen, to a temperature of about 400° to 500° C, in its partially vaporized and partially pulverized state it is then passed into the gas stream, first in a zone heated to between about 600° and 800° C, then for a longer time in at least one lower temperature zone advantageously in the range of 400° to 500° C and finally the products of the reaction or reactions are recovered for subsequent use or conversion.

Paraffinic products which were unusable in practice can thus be vaporized.

4 Claims, 2 Drawing Figures

PATENTED DEC 12 1972
3,705,926
FIG.1
FIG.2
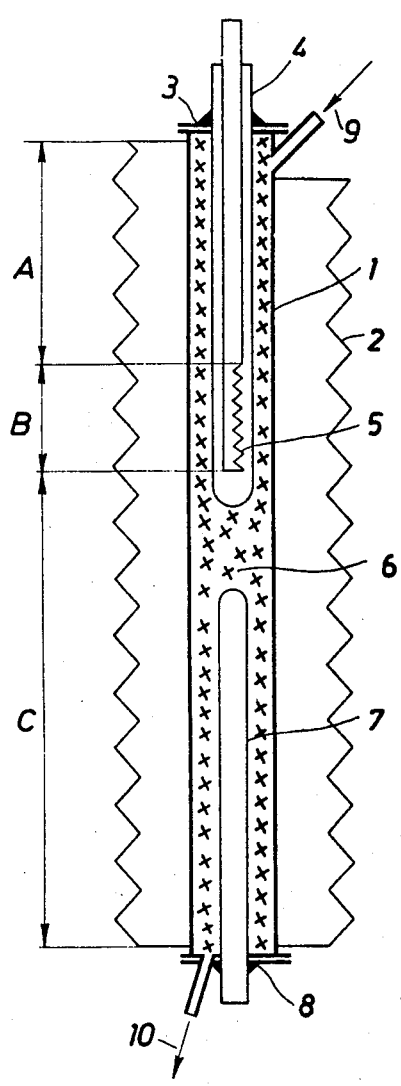
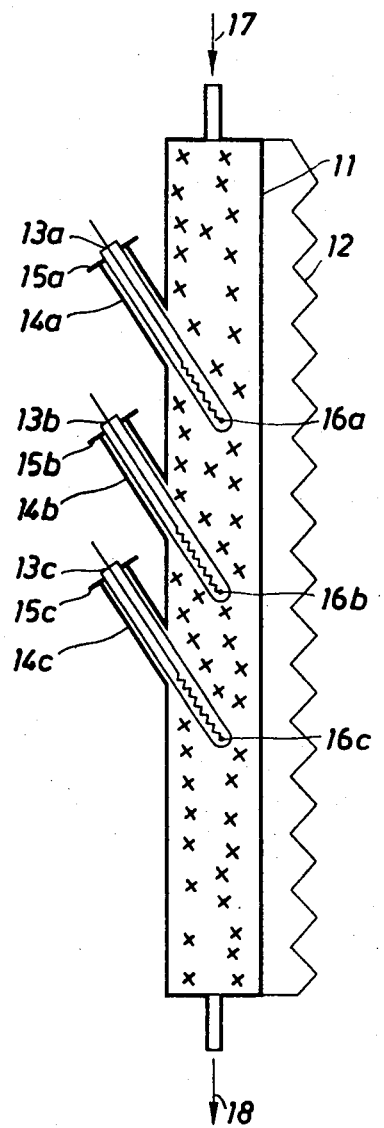
INVENTORS
PAUL RUMPF
BYOUK BLOURI
BY
Howard and Littell
ATTORNEYS

MANUFACTURE OF LONG CHAIN ALPHA-OLEFINES FROM MIXTURES OF HEAVY PARAFFINS

This invention relates to a process for preparing long chain α-olefins from high molecular mass paraffins non vaporizable at atmospheric pressure. The invention relates to primary stocks derived more particularly from the vacuum distillation of less volatile petroleum fractions, such as heavy solid paraffins, or heavy waxes containing, as well as these paraffins, appreciable amounts of heavy oils.

The invention also relates to α-olefins obtained according to the said process and which are rich in mixtures of about seven to 20 carbon atoms particularly as products for the synthesis of biodegradable detergents.

In order to protect river water and prevent its being contaminated by the ever increasing use of cheap, non-biodegradable anionic detergents such as secondary alkylsulfates, or alkylarylsulfonates, an endeavor is made to replace these compounds by biodegradable surfactants. The latter having a hydrophile group at the end of a long, unbranched chain.

It is known that long chain α-olefins with 10 to 20 or 25 carbons can be converted into primary alcohols, for instance, and that the esterification of these alcohols with sulfuric acid, followed by neutralization, or their condensation with ethylene oxide, provides excellent hydrosoluble or liposoluble biodegradable surfactants.

It is also known that ethylene can be prepared from petroleum hydrocarbons, which are subsequently converted into higher α-olefins by means of organometallic compounds, under fairly costly operating conditions (Ziegler process).

The again, α-olefins have already been prepared from normal saturated hydrocarbons, directly by thermal cracking at moderate temperatures in the range of 550°–600° C. Under these conditions, unfortunately, conversion yield is low and the temperature rise favors undesirable secondary cracking reactions: displacement of the double bond, hydrocarbonaceous chain-branching, complete decomposition into gaseous products and carbonization by the elimination of hydrogen.

It is further known that chemical agents such as bromine, oxygen, peroxides, also encourage secondary reactions, this resulting in very complex mixtures from which it is no longer possible to isolate α-olefins by fractional distillation.

Now, both on an industrial and an economic level, problems arise relating both to the use of liquid fuel products named "fuel oils" whose solidifying points increase considerably owing to their high paraffin content, and to the large amounts of these paraffins which are made available by the treatment of various petroleum fractions and are themselves difficult to use as cheap fuel.

It should be recalled here that a process of the prior art, known as the CHEVRON process, enables α-olefins to be prepared by cracking waxes or other heavy paraffins in the presence of steam. But, in this case, a fairly low conversion yield, in the range of 15 to 30 percent must be accepted, otherwise very complex mixtures are obtained. The presence of steam, which is indispensable to lessen the risk of clogging the furnaces, also favors secondary cracking reactions and the α-olefin mixtures are less pure.

It is also known that chain reactions which provide α-olefins as primary cracking products are effected in two steps: initiation and propagation. The initiation reaction (formation of free radicals), necessitates a relatively high temperature, 600° to 700° C. Keeping hydrocarbons at such a temperature for long periods of time considerably encourages secondary cracking reactions and the presence of catalysts, including that of the metal reactor walls, further accentuates this effect.

It has also been suggested that, to obtain long-chain α-olefins, paraffinic hydrocarbons should be subjected to a thermal shock, by first subjecting them to the temperature necessary for the reaction (from 500° to 1,000° C.), then to a substantially lower temperature, the step being carried out very rapidly in the presence of steam or an inert gas, at a pressure at least equal to atmospheric pressure, and preferably by imparting a swirling movement to the materials treated.

Additional studies have shown that the propagation of the α-olefin generating reactional chain does not necessitate such high temperatures; this reaction being carried out at 400°–500° C. At such temperatures, the longer contact time and the presence of metal walls cause hardly any secondary reactions.

Only these last studies led to the process described in French Pat. No. 1,457,683, which enables saturated hydrocarbons such as n-dodecane, n-tetradecane and the like to be treated in the gaseous state.

According to this last patent, long-chain α-olefin mixtures are prepared by pyrolysis of saturated hydrocarbons by passing the said hydrocarbons in a gaseous state into a reaction zone comprising, in the direction of the gas flow, at least one high temperature zone, at between 600° and 1,000° C. for instance, followed by a zone at a temperature lower than 600° C., between about 300° and 450° C. for instance, and which is longer than the high temperature zone.

In order to obtain long-chain α-olefins from the aforesaid waxes and heavy paraffins at present available but not industrially usable for this purpose, the inventors then had the idea, which is the basis of this invention, of subjecting these waxes and heavy paraffins to independent initiation and propagation reactions and to ensure their being cracked in an at least partially liquid phase, by means of a carrier gas such as nitrogen or methane.

In other words, the invention relates to a process for carrying out, at atmospheric pressure and without steam, controlled cracking of very heavy paraffins, which cannot be distilled at the said pressure, by operating on such paraffins or waxes which are largely in a liquid state and are drawn along in an inert and harmless gas flow.

It was unexpectedly found that, under these conditions, the efficiency of paraffin conversion, whether fairly pure or if it contained nearly 30 percent oil, could be higher than 90 percent, and furthermore that, owing to the absence of agents catalyzing the secondary cracking reactions, such as oxygen, steam, or even the metal walls in the zones where the temperature is higher than 500° C., the α-olefins in the mixtures resulting from cracking according to the invention could even be more than 90 percent pure.

The present process consists first, in arranging distinct reaction zones in a same reactor maintained at different temperatures to carry out independent initiation and propagation of cracking chain reactions; second, in introducing into the reactor at least one inert or harmless carrier gas, such as nitrogen or methane, so as to carry out liquid phase cracking of non distillable paraffinic fraction at atmospheric pressure, the paraffins used as primary stock being liquid and partially vaporized and drawn along by the carrier gas as droplets.

To carry out said process, use may advantageously be made of a device similar to that of the aforesaid French Pat. 1,457,683, consisting of en elongated furnace, provided at each end respectively with at least one inlet and one outlet, and heating means providing a high temperature along a short portion adjacent to the inlet, the said furnace comprising an outer, stainless steel casing with, at least along the length of the high temperature heating zone, a refractory sheath or lagging having a dilatation compatible with that of the metal supporting it, the said sheath or lagging ensuring superheating and leaving a free space between it and the inner wall of the furnace, the said free space being filled in the known manner with pieces of an inert heat conductive contact mass such as carborundum, means further being provided to introduce into the furnace a current of inert carrier gas, such as nitrogen.

The sheath can be of quartz, kaolin or other inert refractory material, and applied directly along the furnace axis. It is also possible to use a metal cylinder of ordinary stainless steel, covered externally with a layer of the selected inert material, and placed in the stainless steel body the cylinder and lagging material having comparable dilatations.

The high temperature required in the furnace can also be obtained by using one or more superheating elements introduced obliquely into the furnace with respect to the longitudinal axis thereof, so as to provide a single high temperature zone, or a zone consisting of several partial high temperature zones.

FIGS. 1 and 2 of the appended drawings show diagrammatic longitudinal cross-sections of two examples of cracking furnaces advantageous for carrying out the present process, and which are described in detail hereinafter.

In the example shown in FIG. 1, the furnace 1 is made of stainless steel and it is heated by an electric resistance 2. An assembly of flanges and packing box 3 of known type maintaining a quartz sheath 4 within the furnace. The end of sheath 4 is heated by an electric resistance 5. This sheath 4 could, moreover, by heated by any other known means, notably by controlled oxidation of a mixture of air and hydrocarbons.

The inner chamber of the furnace is filled with an inert but heat conductive contact mass 6, such as pieces of carborundum. At a certain distance from the end of sheath 4 which is within the furnace, the space in the axial portion of the furnace towards the bottom thereof is decreased by another metal sheath 7, held by an assembly of flanges and packing box 8 similar to that used for sheath 4 at the top portion of the furnace. At its upper end, furnace 1 comprises at least one inlet pipe 9 for the mixture to be treated; at the lower end of furnace 1 there is provided at least one outlet pipe 10. Thermocouples, not shown, are disposed by any known means in sheaths 4 and 7 to permit temperature control and regulation in various parts of the furnace.

Under these conditions, the previously liquified paraffins are introduced with a small amount of carrier gas as nitrogen, through pipe 9. They are preheated to the furnace temperature, 400° to 500° C. in zone A of the furnace situated above resistance 5. The partially vaporized and partially pulverized mixture in the nitrogen stream passes through zone B heated to between 600° and 800° C. by resistance 5 and where the cracking initiation reactions occur; the very short time the mixture takes to pass through this high temperature zone, and the absence of a metal surface in the said zone, decreases to a minimum, by practically eliminating them, the undesirable, unfavorable secondary reactions existing in the known processes. Indeed, the propagation reactions which generate $\alpha$-olefins develop and occur in the lower portion C of the furnace, where the temperatures are lower, in the range of 400°–500° C.; at these temperatures secondary reactions are very slow, even in contact with the metal furnace walls and sheath 7.

In the variant shown in FIG. 2, the entire length of the stainless steel furnace 11 is heated by an electric resistance 12. Superheating sheathes 13a, 13b, 13c are disposed laterally to the furnace in metal tubes 14a, 14b, 14c, the assembly is sealed, as is the case in FIG. 1, by assemblies of flanges and packing box 15a, 15b and 15c. Heating resistances 16a, 16b and 16c are positioned in the center of sheaths 13a, 13b, 13c. In this example, only the outer walls of the superheating sheathes are of inert material, all the remainder of the apparatus can be made of metal, advantageously stainless steel. Carborundum 6, or another material, fills the free inner space of furnace 11. The inlet 17 for the mixture to be treated, such as paraffins, is situated at the top of the furnace to facilitate the flow of liquids which have been previously pulverized with the nitrogen stream. The cracked products leaving the furnaces through pipe 18.

Hereinafter therewill be given various examples of cracking, carried out according to the invention, of increasingly heavier paraffins, and during which it was established that neither the process in the gas phase according to the aforesaid U.S. Pat. No. 1,457,683, nor the other known processes enabled the results provided by the present process to be obtained.

EXAMPLE 1

A mixture of paraffins melting at 50°–52° C. and composed of normal 20 to 28 carbon hydrocarbons, together with 26 l/h nitrogen, is introduced at a rate of 160 g/h, into a stainless steel furnace according to FIG. 1, having a total volume of one liter, filled with carborundum and having a quartz sheath heated internally by an electric resistance. The temperature of the furnace assembly was maintained constant at 480° C. and the temperature of the quartz sheath was maintained lower than or equal to 680° C. A liquid mixture is obtained, with a flow rate of 90 g/h and cracked gases with a flow rate of 57 g/h. The composition of the cracked gases and liquids was determined by vapor phase chromatography.

| In vol %, the gases consisted of: | |
|---|---|
| Methane | 19.90 |
| Ethane | 9.64 |
| Ethylene | 36.74 |
| Propane | 1.51 |

| | | |
|---|---|---|
| Propene | 18.37 | |
| Butenes | 8.75 | |
| Butadiene | 5.04 | |

The liquids consisted of 32 percent unreacted paraffins, 3 percent aromatic and unidentified hydrocarbons and 65 percent α-olefins. Consequently, the conversion rate of treated paraffins was 81 percent and the yield of reacted paraffins, converted into 60 -olefins was 45 percent.

The composition in gram-percent of the various α-olefins in the liquid mixture from cracking was as follows:

| | | |
|---|---|---|
| Pentene or hexene | 11.25 | |
| Heptene | 7.10 | Total of 5 to 10 |
| Octene | 5.36 | carbons 31.85% |
| Nonene | 3.79 | |
| Decene | 4.35 | |
| Undecene | 3.80 | |
| Dodecene | 3.47 | |
| Tridecene | 3.64 | |
| Tetradecene | 3.69 | Total of 11 to 20 |
| Pentadecene | 3.42 | carbons 29.15% |
| Hexadecene | 2.84 | |
| Heptadecene | 2.55 | |
| Octadecene | 2.12 | |
| Nonadecene | 2.02 | |
| Eicosene | 1.62 | |
| Heneicosene | 1.36 | |
| Docosene | 1.43 | |
| Tricosene | 0.55 | |
| Tetracosene | 0.59 | |
| Pentacosene | trace | |
| Hexacosene | trace | |

EXAMPLE II

Under the same operating conditions, a mixture of heavy paraffins melting at 60°–62° C. and composed of normal 24 to 36 carbon hydrocarbons was cracked with a flow rate of 165 g/h. For the same cracking rate, less heat had to be provided and the electric power of resistance 5 was lowered from 135 watts for example 1, to 115 watts for the present example. 94 g/h of cracked liquid and 55.4 g/h cracked gas were obtained. The composition of the cracked gas was substantially the same as that of the gas of example I, but owing to the very high molecular mass of the unreacted paraffins, it was impossible to carry out gas phase chromatography without preliminary fractional distillation. The cracked liquid was distilled under 1 mm of mercury to 150° C. Composition of the distillate was determined by gas phase chromatography and the α-olefin content of the undistilled portion was calculated according to the bromine value.

The liquids consisted of 25 percent unreacted paraffin 69 percent α-olefins and 6 percent aromatic or unidentified hydrocarbons. The conversion rate was 83–84 percent and 48 percent of the paraffin was effectively converted into α-olefins.

The composition, in gram-percent of the fraction of 5 to 21 carbon α-olefins in the cracked liquid was as follows:

| | | |
|---|---|---|
| Pentene and hexene | 1.98 | |
| Heptene | 2.10 | total of 5 to 10 |
| Octene | 1.91 | carbons 11.09% |
| Nonene | 2 | |
| Decene | 3.11 | |
| Undecene | 3.37 | |
| Dodecene | 3.26 | Total of 11 to 20 |
| Tridecene | 3.62 | carbons 31.80% |
| Tetradecene | 4.56 | |
| Pentadecene | 4.71 | |
| Hexadecene | 4.49 | |
| Heptadecene | 3.73 | |
| Octadecene | 2.42 | |
| Nonadecene | 1.35 | |
| Eicosene | 0.29 | |
| Heneicosene | 0.28 | |

The remainder of the mixture consisted of olefins with more than 21 carbons and unreacted paraffins. It must be admitted that if very heavy paraffins are used, a portion of the light 5 to 7 carbon olefins is lost during handling. Cracking efficiency and α-olefin yields are increased as the molecular mass of the starting paraffins is higher. The composition of these olefins also becomes more advantageous for the synthesis of biodegradable surfactants, the mixture being richer in 11 to 20 carbon α-olefins.

EXEMPLE III

A mixture of even heavier paraffins, named "Wax 80" melting at 80 ° C. and composed of normal hydrocarbons of up to 45 carbons and containing a minor amount of oil, was cracked under the same operating conditions and at the same rate as in example II. Yields of 83 g/h liquids and 64 g/h cracked gas were obtained. The gas composition was substantially the same as that of examples I and II, and the mixture was analyzed after preliminary fractional distillation as in example II. This liquid contained 20 percent unreacted paraffins, 71.3 % α-olefins and 8.6 percent aromatic and unidentified hydrocarbons. The composition of the five to 22 carbon α-olefins in the cracked liquid was as follows:

| | | |
|---|---|---|
| Pentene and hexene | trace | |
| Heptene | 3.30 | total of 5 to 10 |
| Octene | 4.19 | carbons 13.03% |
| Nonene | 2.74 | |
| Decene | 2.80 | |
| Undecene | 3.94 | |
| Dodecene | 3.45 | |
| Tridecene | 3.41 | total of 11 to 20 |
| Tetradecene | 4.08 | carbons 35.48% |
| Pentadecene | 4.45 | |
| Hexadecene | 4.29 | |
| Heptadecene | 4.30 | |
| Octodecene | 3.48 | |
| Nonadecene | 2.68 | |
| Eicosene | 1.40 | |
| Heneicosene | .60 | |
| Docosene | .37 | |

It is seen, therefore, that in the case of heavier paraffins, the α-olefin yield is even higher and the mixture is richer in 11 to 20 carbon α-olefins.

EXAMPLE IV

A mixture of 70 percent heavy paraffins and 30 percent oil was cracked by proceeding as in examples II and III. It is impossible to determine the exact composition of this wax named "gatsch," comprising the heaviest fraction from vacuum petroleum distillation, unpurified by solvent extraction. Apart from normal paraffins, this wax was found to contain at least 30 percent branched chain paraffins and naphtenic hydrocarbon compounds. Even fewer calories were required for cracking the resistance in sheath 4 which was heated with only 100 watts. A very high conversion rate, over 94 percent was, however, obtained.

For a flow rate of 165 g/h primary stock, 114 g/h cracked liquid and 57 g/h cracked gas were obtained. The composition of the gas was substantially the same as that of example I to III, but the composition of the liquid was much more complex. Distillation of 1 kg of the product produced a fraction of 0.6 kg obtained at 1 mm of mercury to 150° C. According to chromatographic analysis of the distilled fraction, it contained 66 percent α-olefins and 34 percent aromatic, napthenic and unidentified aliphatic hydrocarbons. The greater part of the impurities being in the 5 to 11 carbon fraction, the 12 to 20 carbon α-olefins were found to be 80 percent pure. A portion of the impurities consisted of aromatic hydrocarbons and dienes with double terminal bonds. According to their bromine number, distillation residues contained about 80 percent heavy olefins with more than 23 carbons. It was impossible to determine the exact level of α-olefins in this mixture, but whatever the position of the double bonds, the product appeared to be an excellent primary stock for recycling to the furnace.

Cracking heavy olefins with double terminal or non-terminal bonds to obtain α-olefins is even easier than cracking heavy paraffins.

EXEMPLE V

Heavy "gatsh" wax was cracked under the same operating conditions except for lowering the heating in sheath 4 from 110 to watts. Owing to this, very much less gas, 43 g/h, and more liquid, 130 g/h, were obtained. The gas composition was practically the same as that of examples I to IV. Distillation of 1 kg cracked product provided 0.5 kg obtained at 1 mm mercury to 150° C. According to chromatographic analysis of this fraction, the mixture contained 72 percent, 11 to 20 carbons α-olefins were more than 80 percent pure.

The bromine number of the undistilled fraction was also very high viz 40; this fraction was rich in very heavy olefins and constituted an excellent primary stock for recycling in the furnace. Finally, the conversion rate was estimated to be higher than 90 percent for a very high ratio cracked liquid:cracked gas = 130:43.

It will therefore be seen that by this controlled cracking, very much α-olefins, varying from 72 to over 80 percent purity, can be obtained from a very impure primary stock (containing more than 30 percent pol). Branched or cyclic long-chain hydrocarbons are thought to provide a portion of the α-olefins. These hydrocarbons lose their rings and side chains during cracking.

EXAMPLE VI

Unpurified heavy wax (gatsch) was cracked under the same operating conditions as given for example 5, but nitrogen which was used in examples I to 5 as carrier gas, was replaced by methane, at the same rate of 26 l/h. The liquids resulting from this cracking are practically identical in quantity and composition to those obtained in example V., and the cracked gas obtained were rich in methane.

If the amount of methane (26 l/h) introduced as carrier gas is subtracted from the cracked gas, the ratio cracked liquid:cracked gas = 3 remains and practically unchanged.

The invention is not limited to the examples given hereinabove. The process claimed can be applied to any type of impure waxes or paraffins, that is to say, which may contain oils. To obtain the desired α-olefins, these impure primary stocks are, according to the invention subjected to cracking in an at least partially liquid phase with the addition of a carrier gas in the cracking reaction mixture.

We claim:

1. In a process for the production of pyrolysis of long-chain α-olefins from mixtures containing heavy waxes and paraffins, wherein the starting mixture is passed at atmospheric pressure and in the absence of steam successively through first zone at a temperature higher than about 600° C. and a second zone at a temperature lower than 600° C., the improvement consisting in liquifying said starting mixture, introducing into the said liquified mixture at least one inert non-aqueous carrier gas, preheating the said mixture with the carrier gas to a temperature of about 400° to 500° C., thus providing a preheated mixture of gas products and at least partially vaporized and liquid products divided in the gas stream, and successively passing said preheated mixture into a first zone heated to between about 600° and 800° C. for a short period of time to initiate the cracking reactions, then into a second lower temperature zone in the range of between about 400° to 500° C., to effect the propagation reactions for α-olefin development and recovering the cracked products including the desired α-olefins at the outlet of the said second zone.

2. The process of claim 1 wherein said starting mixture consists of impure, heavy waxes and paraffins.

3. The process of claim 1 wherein said starting mixture consists of heavy oil-containing waxes and paraffins.

4. The process of claim 1 wherein the carrier gas is selected from nitrogen and methane.

* * * * *

UNITED STATES PATENT OFFICE
CERTIFICATE OF CORRECTION

Patent No. 3,705,926                        Dated December 12, 1972

Inventor(s)      Paul Rumpf et al.

It is certified that error appears in the above-identified patent and that said Letters Patent are hereby corrected as shown below:

On the cover sheet insert -- [73] Assignee: Etablissement Public: Agence Nationale De Valorisation De La Recherche "Anvar", Puteaux, France --.

Signed and sealed this 1st day of January 1974.

(SEAL)
Attest:

EDWARD M. FLETCHER, JR.           RENE D. TEGTMEYER
Attesting Officer                 Acting Commissioner of Patents

UNITED STATES PATENT OFFICE
CERTIFICATE OF CORRECTION

Patent No. 3,705,926     Dated December 12, 1972

Inventor(s) Paul Rumpf et al.

It is certified that error appears in the above-identified patent and that said Letters Patent are hereby corrected as shown below:

On the cover sheet insert

-- [30] Foreign Application Priority Data

France    6904966    Feb. 26, 1969 --.

Signed and sealed this 10th day of December 1974.

(SEAL)
Attest:

McCOY M. GIBSON JR.
Attesting Officer

C. MARSHALL DANN
Commissioner of Patents